United States Patent
Koufaty

(10) Patent No.: US 7,519,792 B2
(45) Date of Patent: Apr. 14, 2009

(54) MEMORY REGION ACCESS MANAGEMENT

(75) Inventor: David A. Koufaty, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 259 days.

(21) Appl. No.: 11/359,041

(22) Filed: Feb. 21, 2006

(65) Prior Publication Data
US 2007/0195103 A1 Aug. 23, 2007

(51) Int. Cl.
G06F 12/02 (2006.01)

(52) U.S. Cl. .......................................... 711/210

(58) Field of Classification Search ................. 711/201, 711/210, 202
See application file for complete search history.

(56) References Cited

U.S. PATENT DOCUMENTS

| 4,459,661 A * | 7/1984 | Kaneda et al. ............... 718/100 |
| 5,867,723 A * | 2/1999 | Chin et al. ..................... 712/11 |
| 2004/0073909 A1* | 4/2004 | Arimilli et al. .............. 718/105 |

* cited by examiner

Primary Examiner—Kevin L Ellis
(74) Attorney, Agent, or Firm—Thomas R. Lane

(57) ABSTRACT

A memory region access management technique. More particularly, at least one embodiment of the invention relates to a technique to partition memory between two or more operating systems or other software running on one or more processors.

29 Claims, 4 Drawing Sheets

MEMORY REGION ACCESS MANAGEMENT

BACKGROUND

1. Field

The present disclosure pertains to the field of information processing, and, more specifically, to the field of memory management and protection.

2. Background

Information processing systems, such as those including a processor or processors, may run two or more operating systems concurrently. Accordingly, memory may be apportioned between the operating systems, such that each operating system has its own dedicated resources, such as memory, input/output (I/O), memory-mapped hardware configuration information, etc. (generically referred to as "memory address space").

One prior art technique for managing the memory between two or more operating systems running on one or more processors is to physically separate the memory accessed by each operating system. However, this can cause system cost to increase and may require extra devices or other hardware in a computer system, thereby increasing power consumption of the system.

BRIEF DESCRIPTION OF THE FIGURES

The present invention is illustrated by way of example and not limitation in the accompanying figures.

DETAILED DESCRIPTION

Embodiments of the invention relate to computer systems. More particularly, at least one embodiment of the invention relates to a technique to partition memory address space between two or more operating systems or other software running on one or more processors.

In one embodiment, storage areas, such as processor registers, are used to define a range of memory address space accessible by an operating system, software thread, or other software program (referred herein generically as "program" or "software program"). Furthermore, in one embodiment, storage areas, such as processor registers, are used to define what action is to be taken if a software program or operating system attempts to access a memory region defined by a range. In one embodiment, the storage areas are registers within one or more processors. However, in other embodiments, the storage areas may include other memory structures, such as DRAM or SRAM modules, or a non-volatile memory, such as flash memory. Furthermore, in one embodiment memory may be dedicated for use only by a particular processor or processing resource, whereas in other embodiments, memory may be used by any of a number of processors or processing resources.

Figures 1, 2:
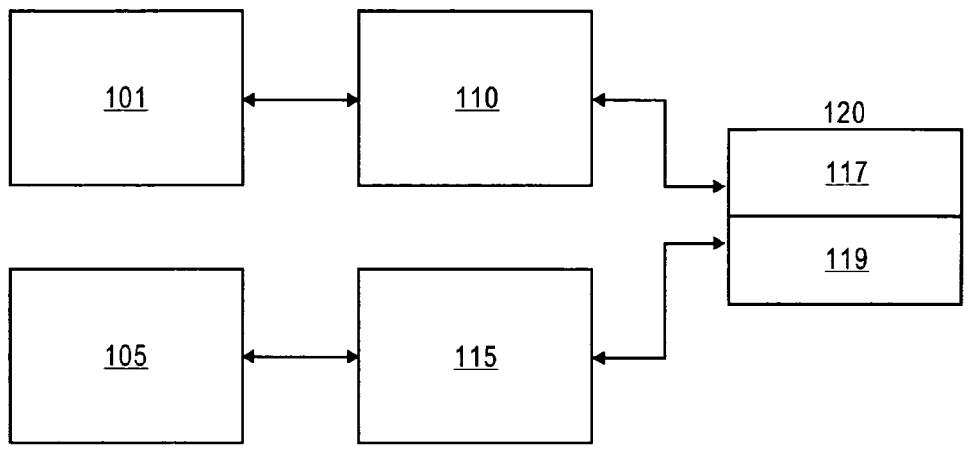
FIG. 1 is a diagram of at least two operating systems interacting with one or more processors to access memory, according to one embodiment of the invention.
FIG. 2 illustrates registers associated with at least one embodiment of the invention.

FIG. 1 illustrates one embodiment of the invention in which two software programs are running on two sets of processing resources, such as two microprocessors, and a memory mapped structure, such as DRAM, cache, memory-mapped I/O or other memory structure, to be accessed by the two software programs. In particular, software programs 101 and 105 may be executed by processing resource 110 and 115, respectively. Memory 120 may contain information, such as data or code that is to be accessed by the software programs. In one embodiment, code or data stored in region 117 of the memory is to be accessed only by software program 101, whereas code or data stored in region 119 of the memory is to be accessed only by software program 105.

In one embodiment, in order to prevent software program 101 from accessing information from memory region 119 or to prevent software program 105 from accessing information from memory region 117, logic, software, or some combination thereof may be used to implement a technique to partition the memory between the two software programs. The software programs 101 and 105 may be operating systems, in one embodiment. Furthermore, the processing resources 110 and 115 may be separate microprocessors or may be logical processors defined by partitioned or dynamically allocated processing resources within the same microprocessor.

For example, in one embodiment, the processing resources are processing cores within a multi-core processor manufactured on the same die or on separate die within the same package. In another embodiment, the processing resources are one processing core whose processing resources are either statically or dynamically allocated between the programs 101 and 105. Furthermore, in one embodiment, the programs may be a multi-threaded program or operating system, in which at least two of the threads are running on only one of the processing resources. The memory regions 117 and 119 may or may not be organized as illustrated in FIG. 1 in some embodiments. For example, the memory regions may not be contiguous in some embodiments, but may actually be interspersed throughout the memory in a non-contiguous manner. Furthermore, the memory may include other memories of varying types, speeds, or capacity.

In order to define regions of memory to be accessed by a program, such as an operating system, at least one embodiment of the invention uses storage locations, such as one or more processor registers, to store an address range accessible by a particular program or operating system. For example, in one embodiment, one or more processor registers are used to store a base address and a limit address, which together define the range of addresses accessible by a program, operating system, thread, etc. Furthermore, at least one embodiment stores an address to where the program, operating system, etc., is to be directed in the event that the program or operating system attempts to access an address range for which it is not allowed.

FIG. 2 illustrates registers that may be used to help control accesses to various memory locations according to one embodiment of the invention. FIG. 2 illustrates a base register 201, which may store, among other things, a base value 203 that indicates the starting address of an area of memory reserved for a particular program, such an operating system, or one particular thread of a multi-threaded program. FIG. 2 also illustrates limit register 205, which may store, among other things, a limit value 207 that indicates the ending address of an area of memory reserved by the program, such that the contiguous memory addresses between the base value and the limit value (perhaps including the base value and the limit value, in some embodiments) may only be accessed by a particular program, operating system, or thread, etc.

In some embodiments, the limit register 205 may store a size value that indicates a range of addresses instead of a limit value, such that the base value summed with the size value would provide the last memory location of the range of addresses that may be accessed by a particular program, operating system, thread, etc. In addition to the base register and the limit register, FIG. 2 illustrates a translation register 210, which may store, among other things, a translation address 213 that corresponds to a memory location (which may or may not exist) to where a program is to access the information requested if the access falls within the range of the addresses defined by the base and limit registers.

In one embodiment, the translation address 213 is an address to some location in memory that will contain a value (e.g., 0xffffffff) that the requesting program interprets to mean that the access was to a restricted address range. In one embodiment, the location corresponds to an address that is beyond an address range that is used by any program, operating system, or thread using the memory space. In one embodiment, the location corresponds to another memory location where the requesting program address is being relocated.

In one embodiment, the limit register also includes a bit storage location to store a "v" bit value to indicate whether the base and limit register pair is enabled and therefore should be used to help define the address range that may be accessed by a particular program, operating system, thread, etc. If the v bit is set, the register is deemed to contain a valid address range that should be used, in one embodiment, whereas if the v bit is not set it is not to be used in defining the range of accessible addresses.

The translation register may store a "t" bit value to indicate whether an access falling inside the range will cause a machine event within a processor running the program. For example, in one embodiment, if the t bit is set, an event will occur if an access is attempted to an address within the address. Whereas, if the t bit is not set, an access to an address within the address range by a program will be redirected to the address contained in the translation address field of the translation register. In one embodiment, the size of the translated memory region is the same as the size of the range defined by the base and limit registers. In other embodiments, the size of the translated memory region might be different from the size of the range defined by the base and limit registers. For example, a bit mask might be used to indicate which bits from the address are to be translated using the value in the translation register.

In one embodiment, the event may be architectural, and therefore user, visible. In other embodiments, the event may not be visible architecturally. In one embodiment, prior art event handling techniques may be used to manage the event.

In some embodiments, two or more of the base, limit, or translation values may be contained in the same register or other memory structure, instead of three different registers. Likewise, in some embodiments, two or more of the v and t bits may be located within the same register or other memory structure. Furthermore, in some embodiments, the function of the v and t bits may be indicated in other ways besides a bit value, such as a logic circuit. Other information may be stored in the base, limit and/or translation registers, indicated by the "reserved" fields in FIG. 2.

In one embodiment the base, limit, and translation registers are located in or otherwise associated with a processor or processor core corresponding to a particular program, operating system, thread, etc. For example, a set of registers similar to those of FIG. 2 may be located in or otherwise associated with each of the processors of FIG. 1, such that one set of registers will control accesses to a memory range controlled by one processor and the other set of registers will control accesses to a memory range controlled by the other processor. In other embodiments, only one set of registers, similar to those illustrated in FIG. 2, may be used to control accesses to two or more address ranges to be accessed by two or more programs, operating systems, threads, etc. For example, in one embodiment, an access that falls outside of the address range indicated by the base and limit registers may be deemed to fall within an address range corresponding to another processor or program and the access may be made to that memory location without comparing it to an address range defined by another set of registers. In other embodiments, the access is check both against a first and second address range and corresponding control bits similar to those described in FIG. 2.

In one embodiment, there might be multiple base, limit and translation registers. These multiple registers might describe overlapping memory ranges. In such cases, a priority scheme needs to be associated with the order in which the multiple memory ranges are check. For example, a fixed order check of the registers can be performed.

Figure 3:
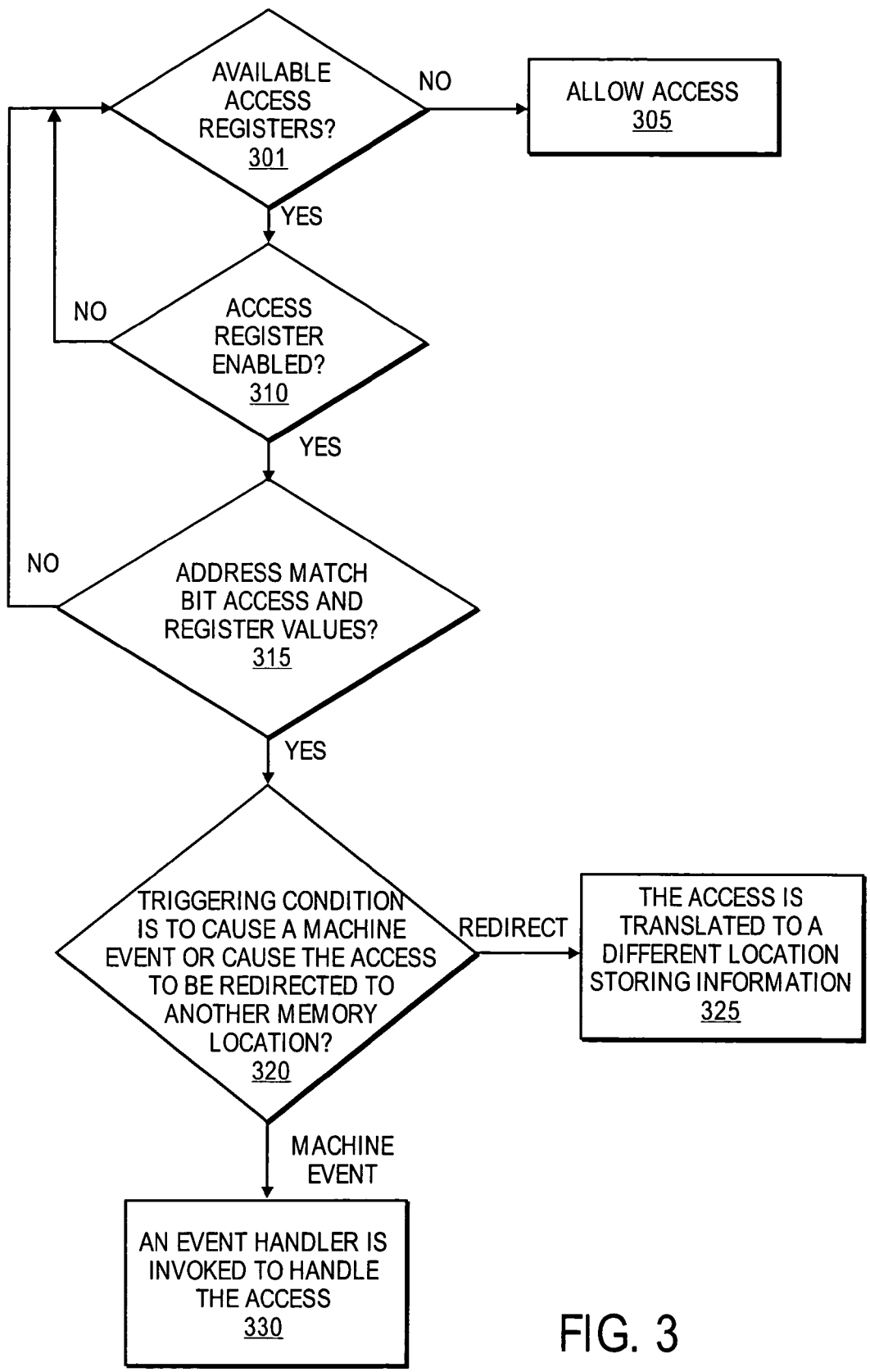
FIG. 3 is a flow chart illustrating various operations associated with at least one embodiment of the invention.

In order to control the accesses made by a program, operating system, thread, etc., in conjunction with the base, limit, v, and t values previously discussed, trigger logic in the form of CMOS circuits, software, or some combination thereof may be used. FIG. 3 is a flow diagram illustrating operations implemented by trigger logic that may be used in conjunction with one embodiment of the invention. In one embodiment, the trigger logic may be implemented in hardware, such as CMOS logic circuits, whereas in other embodiments, the trigger logic may be implemented in software. In yet other embodiments, the trigger logic may be implemented in some combination of hardware and software.

At operation 301, it is determined whether a set of memory access control registers are available to use. If not, then at operation 305, an access to memory is allowed. Otherwise, then at operation 310, if an available access register is enabled, it is determined at operation 315 whether the memory access corresponds to addresses stored in the memory access registers. If so, then at operation 320, it is determined whether a triggering condition is to cause a machine event or cause the access to be redirected to another memory location. If the triggering condition is to cause a machine event, then at operation 325, an event handler is invoked to handle the access. If the triggering condition is to cause the access to be redirected to another memory location, then at operation 330, the access is translated to a different location. This location could be either a location storing information (e.g., 0xffff) to indicate to the requestor that the access was to an impermissible address range or any location where the address from the requester is relocated.

In one embodiment, the triggering event may occur if the access is from a program, operating system, thread, etc., that attempts to access information within a certain address range, whereas in other embodiments, the triggering event may occur if the access is made by a program, operating system, thread, etc., that has permission to access information within the address range, but attempts to access information outside of the address range.

Within the scope of the present invention, the above operations may be performed in a different order, with illustrated block performed simultaneously, with illustrated blocks omitted, with additional blocks added, or with a combination of reordered, combined, omitted, or additional blocks.

In one embodiment, the trigger logic is implemented within a processor containing the base, limit, and translation registers. In particular, in one embodiment, the trigger logic may be associated with the physical address generation logic of the processor, such as within a page miss handler (PMH) logic, in which linear to physical address translation occurs. The trigger logic may also be used in parallel with other memory type detection logic within the processor. In one embodiment, if a trigger condition is detected during a page walk, for example, an event needs to be signaled, the event may be handled in conjunction with other page walk events, such as when an accessed page is not present. If, on the other hand, the access is to be redirected the redirected address may overwrite the address to be generated in the PMH.

In embodiments in which a translation look-aside buffer (TLB) caches page translations, a redirected address generated in one embodiment of the invention, may be cached by the TLB. In such an embodiment, the redirected address may be along a page boundary, such as a 4 KB page boundary.

Figure 4:
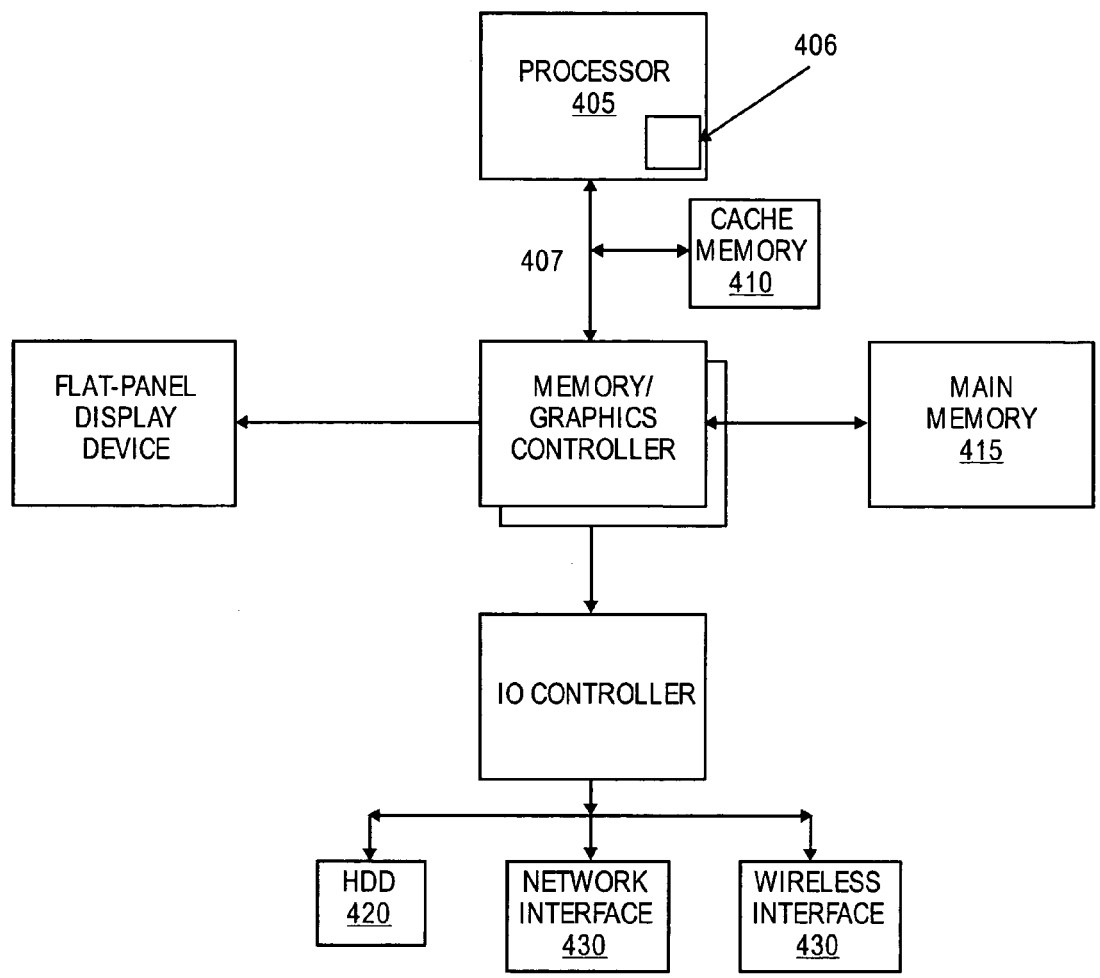
FIG. 4 illustrates a shared-bus system in which one embodiment of the invention may be used.

FIG. 4 illustrates a front-side-bus (FSB) computer system in which one embodiment of the invention may be used. A processor 405 accesses data from a level one (L1) cache memory 410 and main memory 415. In other embodiments of the invention, the cache memory may be a level two (L2) cache or other memory within a computer system memory hierarchy. Furthermore, in some embodiments, the computer system of FIG. 4 may contain both a L1 cache and an L2 cache.

Illustrated within the processor of FIG. 4 is a storage area 406 for machine state. In one embodiment storage area may be a set of registers, whereas in other embodiments the storage area may be other memory structures. Also illustrated in FIG. 4 is a storage area 407 for save area segments, according to one embodiment. In other embodiments, the save area segments may be in other devices or memory structures. The processor may have any number of processing cores. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 420, or a memory source located remotely from the computer system via network interface 430 containing various storage devices and technologies. The cache memory may be located either within the processor or in close proximity to the processor, such as on the processor's local bus 407.

Figure 5:
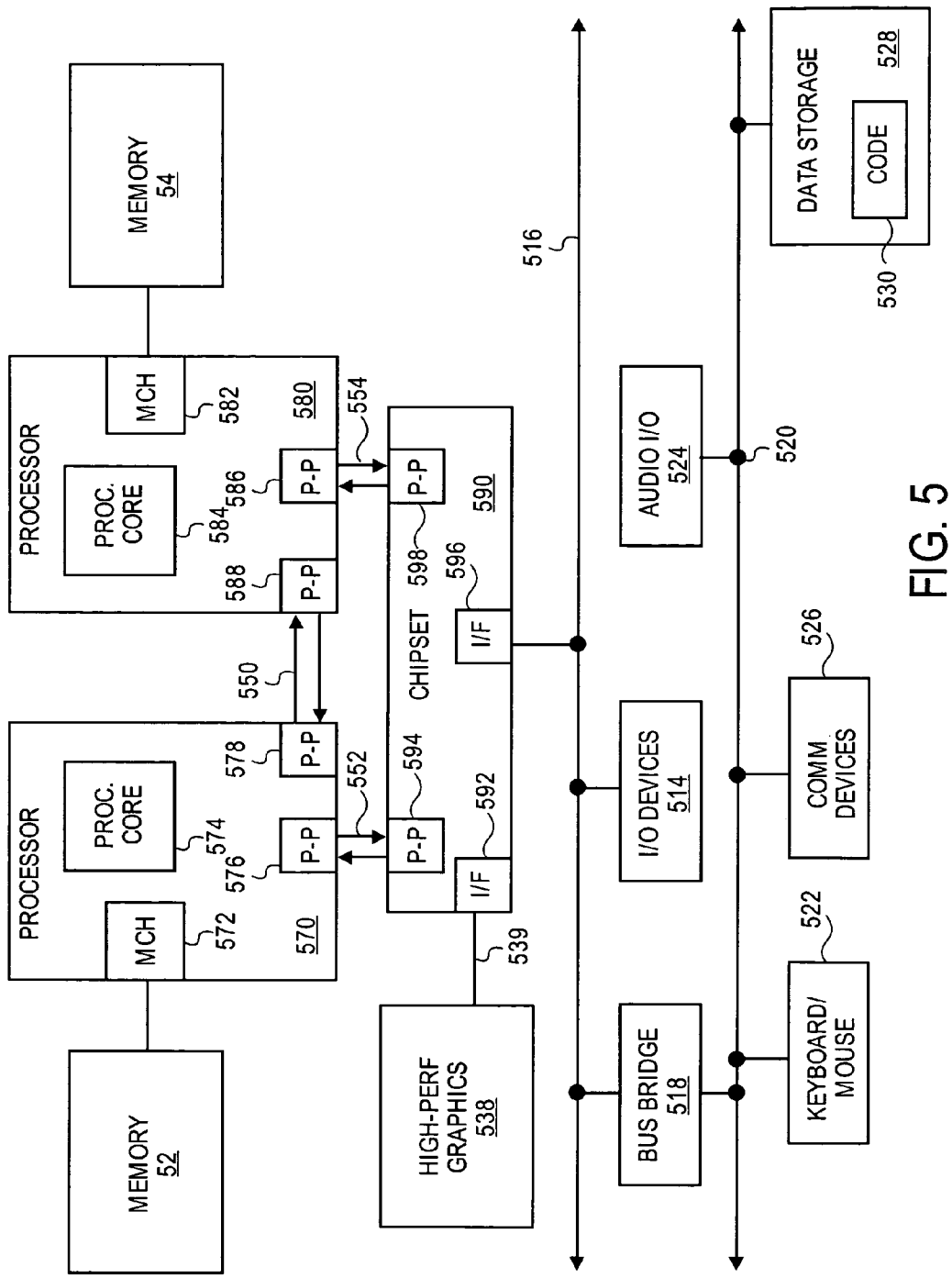
FIG. 5 illustrates a point-to-point bus system in which one embodiment of the invention may be used.

Furthermore, the cache memory may contain relatively fast memory cells, such as a six-transistor (6T) cell, or other memory cell of approximately equal or faster access speed. The computer system of FIG. 4 may be a point-to-point (PtP) network of bus agents, such as microprocessors, that communicate via bus signals dedicated to each agent on the PtP network. FIG. 5 illustrates a computer system that is arranged in a point-to-point (PtP) configuration. In particular, FIG. 5 shows a system where processors, memory, and input/output devices are interconnected by a number of point-to-point interfaces.

The system of FIG. 5 may also include several processors, of which only two, processors 570, 580 are shown for clarity. Processors 570, 580 may each include a local memory controller hub (MCH) 572, 582 to connect with memory 22, 24. Processors 570, 580 may exchange data via a point-to-point (PtP) interface 550 using PtP interface circuits 578, 588. Processors 570, 580 may each exchange data with a chipset 590 via individual PtP interfaces 552, 554 using point to point interface circuits 576, 594, 586, 598. Chipset 590 may also exchange data with a high-performance graphics circuit 538 via a high-performance graphics interface 539. Embodiments of the invention may be located within any processor having any number of processing cores, or within each of the PtP bus agents of FIG. 5.

Other embodiments of the invention, however, may exist in other circuits, logic units, or devices within the system of FIG. 5. Furthermore, in other embodiments of the invention may be distributed throughout several circuits, logic units, or devices illustrated in FIG. 5.

Processors referred to herein, or any other component designed according to an embodiment of the present invention, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these mediums may "carry" or "indicate" the design, or other information used in an embodiment of the present invention, such as the instructions in an error recovery routine. When an electrical carrier wave indicating or carrying the information is transmitted, to the extent that copying, buffering, or re-transmission of the electrical signal is performed, a new copy is made. Thus, the actions of a communication provider or a network provider may be making copies of an article, e.g., a carrier wave, embodying techniques of the present invention.

Thus, techniques for steering memory accesses, such as loads or stores are disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

Various aspects of one or more embodiments of the invention may be described, discussed, or otherwise referred to in an advertisement for a processor or computer system in which one or more embodiments of the invention may be used. Such advertisements may include, but are not limited to news print, magazines, billboards, or other paper or otherwise tangible media. In particular, various aspects of one or more embodiments of the invention may be advertised on the internet via websites, "pop-up" advertisements, or other web-based media, whether or not a server hosting the program to generate the website or pop-up is located in the United States of America or its territories.

What is claimed is:

1. A processor comprising:
   a base register including a base field to indicate a starting address of a first memory region corresponding only to a first software program to access information from a first address;
   a limit register including a limit field to indicate the ending address of the first memory region;
   a translation register including a translation field to indicate a redirected address to where the first software program is to access the information, the redirected address being different than the first address; and
   a v bit storage area to store a v bit to indicate whether the base register is enabled.

2. The processor of claim 1 further comprising a t bit storage area to store a t bit to indicate whether a machine event is to occur in response to a trigger condition.

3. The processor of claim 2 wherein the v bit storage area is located within the limit register and the t bit storage area is located within the translation register.

4. The processor of claim 1, further comprising trigger logic to cause the first software program to access information from the redirected address if the v bit indicates that the base register is enabled.

5. The processor of claim 4, wherein if the first address is within the first memory region and the v bit indicates that the register is enabled and the t bit indicates that the access is to be redirected, then the access by the first program is to be redirected to the translation address.

6. The processor of claim 5, wherein the redirected address is outside of the first memory region and contains a code to indicate to the first software program that the access is invalid.

7. The processor of claim 1, wherein the software program includes an operating system.

8. The processor of claim 1, wherein the software program includes a software thread.

9. An apparatus comprising:
   trigger logic to cause either a machine event if a t bit is set to first state and a first condition is satisfied, and to cause an access by a software program to a first memory region to be redirected to a redirected address outside of the first memory region if the t bit is set to a second state and the first condition is satisfied.

10. The apparatus of claim 9, wherein the redirected address includeds hexadecimal value 0xffffffff.

11. The apparatus of claim 9, wherein the first condition includes the software program accessing a region of the first memory region.

12. The apparatus of claim 9, further comprising a processor.

13. The apparatus of claim 12 wherein the first memory region is to be defined by a base value within a base register and a limit value within a limit register.

14. The apparatus of claim 13 wherein the redirected address is indicated by a translation value within a translation register.

15. The apparatus of claim 9 wherein the trigger logic is within a page miss handler logic within a processor.

16. The apparatus of claim 15 wherein the processor includes a translation look-aside buffer to store the redirected address.

17. A system comprising:
   a first processor in which a first program is to run;
   a second processor in which a second program is to run;
   a memory including a first memory range and a second memory range, the first memory range corresponding to the first program and the second memory range corresponding to the second program, the first processor comprising a first trigger logic to indicate whether the second program has attempted to access the first memory range.

18. The system of claim 17 wherein the second processor comprises a second trigger logic to indicate whether the first program has attempted to access the second memory range.

19. The system of claim 18 wherein if the first program attempts to access the second memory range, the second processor is to return to the first program a code to indicate that the access from the first program to the second memory range is invalid.

20. The system of claim 18 wherein if the second program attempts to access the first memory range, the first processor is to return to the first program a code to indicate that the access from the second program to the first memory range is invalid.

21. The system of claim 19, wherein the code is be stored in a redirected address located outside of the second memory range and the first memory range.

22. The system of claim 20 wherein the the code is to be stored in a redirected address located outside of the second memory range and the first memory range.

23. The system of claim 21 wherein the redirected address is to be provided within a translation register within the first processor.

24. The system of claim 22 wherein the redirected address is to be provided within a translation register within the second processor.

25. A method comprising:
   a processor redirecting a first access to a first memory region by a first software program based on a first user-configurable setting;
   the processor redirecting a second access to a second memory region by a second software program based on a second user-configurable setting.

26. The method of claim 25 wherein the processor includes a v bit storage area to store a v bit to indicate whether the limit field is valid, and a t bit storage area to store a t bit indicate whether machine event is to occur in response to a trigger condition by the first access being within the first memory region.

27. The method of claim 25 wherein the processor includes a v bit storage area to store a v bit to indicate whether the limit field is valid, and a t bit storage area to store a t bit to indicate whether a machine event is to occur in response to a trigger condition by the second access being within the second memory region.

28. The method of claim 25 wherein the processor includes trigger logic to cause either a machine event or to cause an access by the first software program to the first memory region to be redirected to a redirected address outside of the first memory region if a condition is satisfied.

29. The method of claim 25 wherein the processor includes trigger logic to cause either a machine event or to cause an access by the second operating system to the second memory region to be redirected to a redirected address outside of the second memory region if the condition is satisfied.

* * * * *